United States Patent
van der Eerden et al.

(10) Patent No.: US 8,726,794 B2
(45) Date of Patent: May 20, 2014

(54) FRYING DEVICE

(75) Inventors: Hendricus Franciscus Jacobus Maria van der Eerden, Gemert (NL); Mattheus Catharina Willems, Nuenen (NL)

(73) Assignee: Marel Townsend Further Processing B.V., Boxmeer (NL)

( * ) Notice: Subject to any disclaimer, the term of this patent is extended or adjusted under 35 U.S.C. 154(b) by 744 days.

(21) Appl. No.: 12/743,199

(22) PCT Filed: Nov. 14, 2008

(86) PCT No.: PCT/NL2008/000252
§ 371 (c)(1),
(2), (4) Date: May 14, 2010

(87) PCT Pub. No.: WO2009/064176
PCT Pub. Date: May 22, 2009

(65) Prior Publication Data
US 2010/0247726 A1 Sep. 30, 2010

(30) Foreign Application Priority Data

Nov. 16, 2007 (NL) .................................... 1034711

(51) Int. Cl.
*A23L 1/01* (2006.01)
*A47J 37/12* (2006.01)

(52) U.S. Cl.
USPC .................... 99/408; 99/403; 99/404; 99/405; 99/406; 99/407; 165/154; 165/177; 165/164

(58) Field of Classification Search
USPC ............ 99/403, 404, 405, 406, 407; 165/154, 165/177
See application file for complete search history.

(56) References Cited

U.S. PATENT DOCUMENTS 2,432,362 A * 12/1947 Worn et al. ................. 165/134.1
2,870,997 A * 1/1959 Soderstrom .................... 165/141
(Continued)

FOREIGN PATENT DOCUMENTS

| GB | 854057 A | 11/1960 |
| JP | 6-105753 A | 4/1994 |
| WO | WO 91/03973 A1 | 4/1991 |

*Primary Examiner* — Dana Ross
*Assistant Examiner* — Jimmy Chou
(74) *Attorney, Agent, or Firm* — Birch, Stewart, Kolasch & Birch, LLP

(57) ABSTRACT

The present invention relates to a frying device for carrying out a frying process for food products (2) comprising a frying oil reservoir (20) which can be filled with a volume of frying oil; a food product carrier (3) which can at least partially be immersed in the frying oil in the frying oil reservoir and at least one heating unit (30) having at least one heating element (31) which is positioned at least partially inside the frying oil reservoir and which has a heating surface (32a) which is in contact with the frying oil in the frying oil reservoir during the frying process. Characteristic of the frying device according to the invention is the fact that the heating unit comprises a frying oil duct (35) with a channel-heating surface (35a). Furthermore, the heating unit comprises a first pump (38) for passing frying oil through the frying oil duct. During the frying process, the frying oil duct is in flow communication with the volume of frying oil in the frying oil reservoir, as a result of which frying oil can be passed from the frying oil reservoir through the frying oil duct.

17 Claims, 5 Drawing Sheets

(56) References Cited

U.S. PATENT DOCUMENTS

| | | | |
|---|---|---|---|
| 4,228,848 A * | 10/1980 | Wadkinson, Jr. | 165/134.1 |
| 4,461,347 A * | 7/1984 | Layton et al. | 165/133 |
| 4,554,969 A * | 11/1985 | Carnavos | 165/154 |
| 4,638,852 A * | 1/1987 | Basseen et al. | 165/47 |
| 4,719,968 A * | 1/1988 | Speros | 165/154 |
| 5,074,199 A * | 12/1991 | Miller | 99/404 |
| 5,221,055 A * | 6/1993 | Kuan | 241/199.12 |
| 5,253,567 A * | 10/1993 | Gunawardena | 99/404 |
| 7,141,764 B1 * | 11/2006 | Shumate | 219/430 |
| 7,686,952 B2 * | 3/2010 | Bivens | 210/167.28 |
| 7,775,154 B2 * | 8/2010 | Hutchinson et al. | 99/323 |
| 2001/0029846 A1 * | 10/2001 | Nothum et al. | 99/404 |
| 2002/0006460 A1 * | 1/2002 | Hwang | 426/438 |
| 2002/0157815 A1 * | 10/2002 | Sutter | 165/154 |
| 2006/0225865 A1 * | 10/2006 | Bonner | 165/46 |
| 2010/0326289 A9 * | 12/2010 | Theodos et al. | 99/408 |

\* cited by examiner

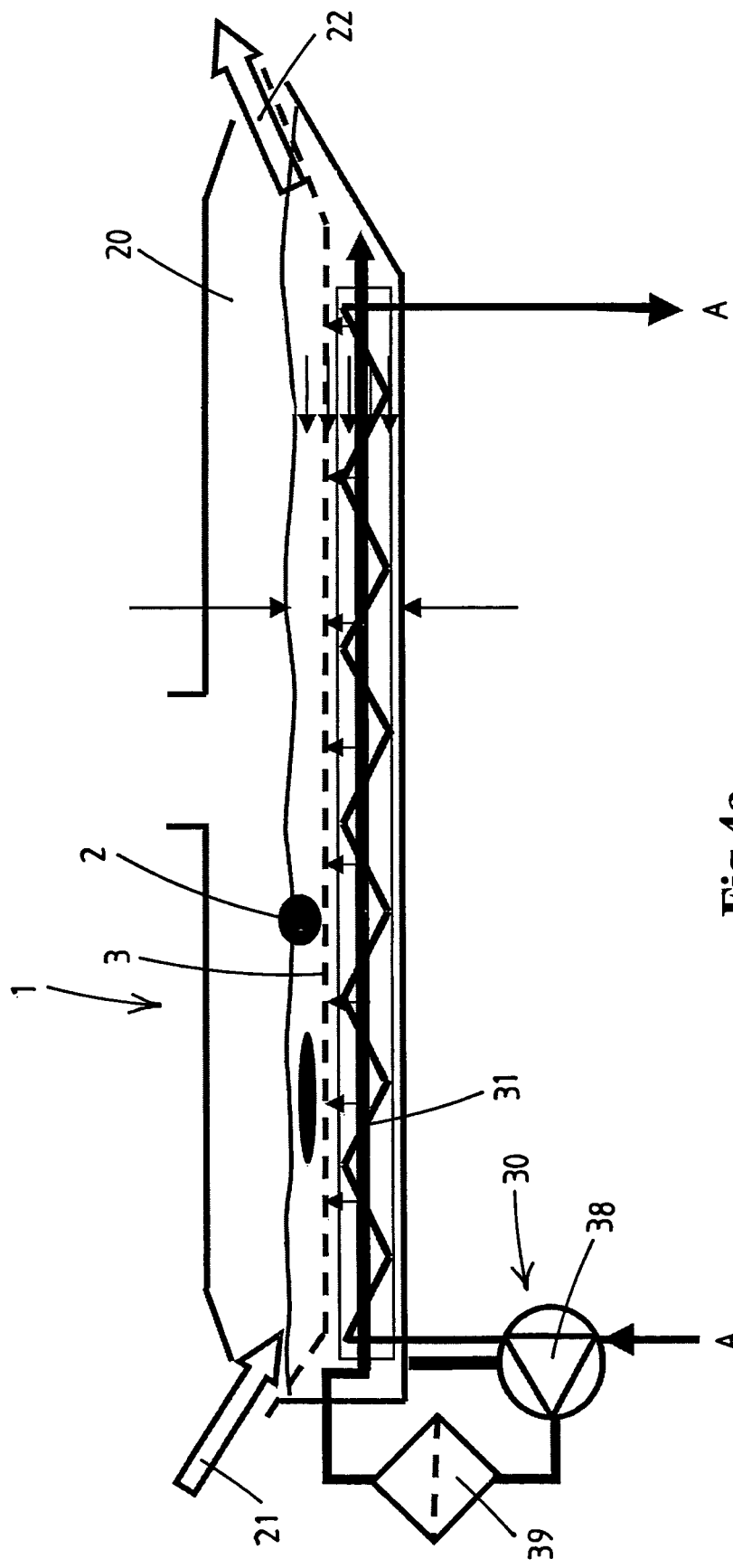

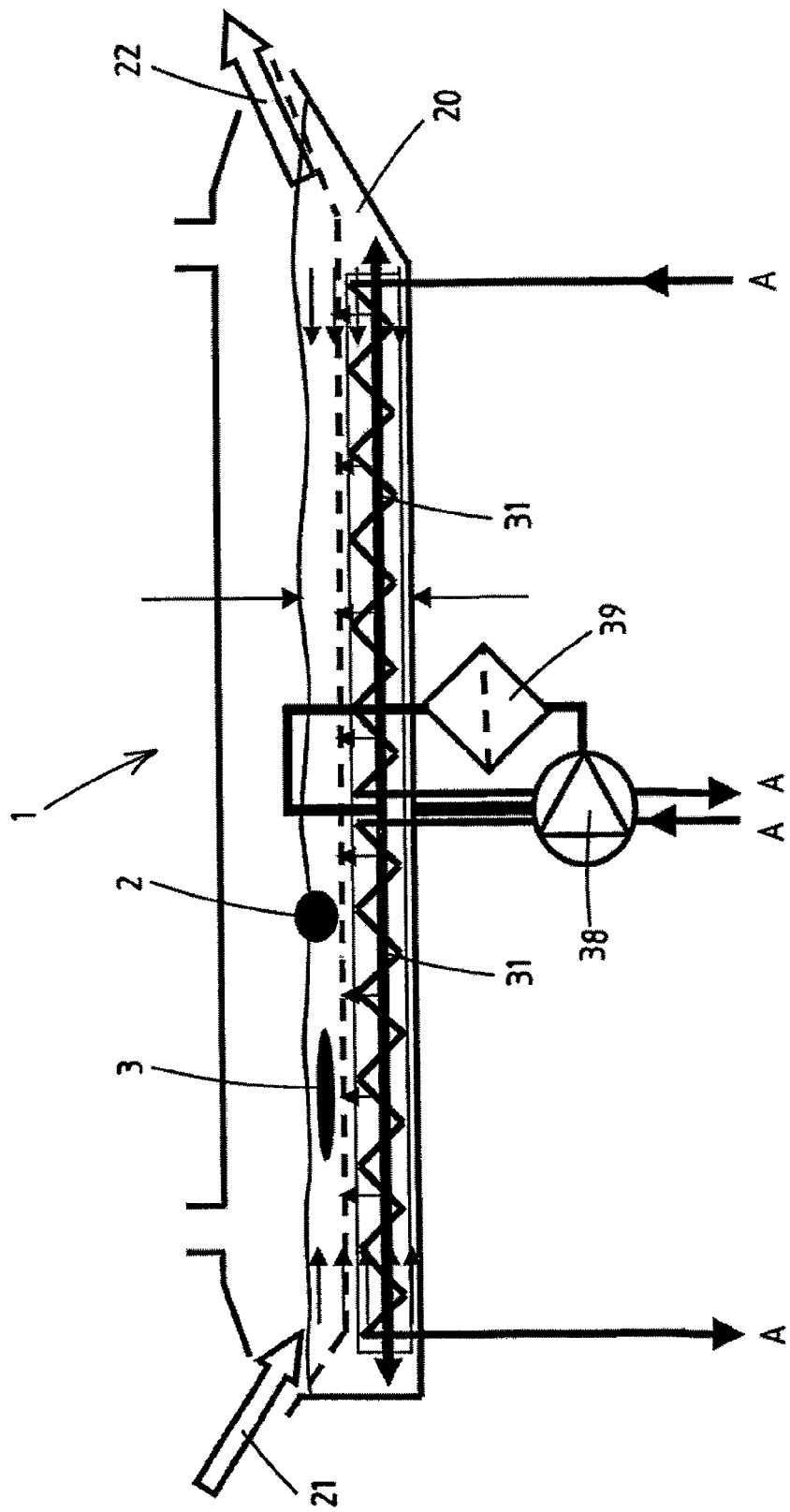

FRYING DEVICE

The present invention relates to a frying device for carrying out a frying process for food products comprising a frying oil reservoir which can be filled with a volume of frying oil; a food product carrier which can at least partially be immersed in the frying oil in the frying oil reservoir and at least one heating unit having at least one heating element which is positioned at least partially inside the frying oil reservoir and which has a heating surface which is in contact with the frying oil in the frying oil reservoir during the frying process.

In particular, the invention relates to a frying device which is designed to be used in an industrial-scale food-processing system.

Furthermore, the invention relates to a method for frying food products.

A frying device of this type is known from US 2001/0029846 which discloses a frying device for deep-frying or frying large amounts of food products in a continuous process on an industrial scale. The frying device has a frame which extends in the axial direction from a feed position to a discharge position for food products. An elongate horizontal tray containing a volume of frying oil, also referred to as "deep-frying channel" or "frying channel", is fixedly connected to the frame. The frying channel can be filled with a volume of frying oil which is also known as fat, deep-frying fat, frying oil, etc. The food products, such as potato products, combination products containing for example cheese or vegetables, meat or fish products which are to be fried, are conveyed through the frying channel while being clamped between two conveyors.

The known industrial deep-frying device comprises one or two heating units of the indirectly heated type placed one behind the other. Heating units of the indirect heating type have an operational principle which is based on circulating a thermal fluid using a heat pump, said thermal fluid being heated at a remote source of heat.

The structural design of the heating units is disclosed further in U.S. Pat. No. 5,253,567. Each heating unit comprises several vertically oriented heat-transfer plates. The plates of the heating unit are immersed in the frying oil in the frying channel and heat the volume of frying oil up to a predetermined temperature as a result of the thermal fluid flowing in the heating unit. The vertically oriented heat-transfer plates are effectively hollow vessels forming a flow passage for passing through the thermal fluid. The vessels of the heating unit are composed of two vertically arranged sheets. The external surface of the sheets serves as a heating surface and is in contact with the frying oil in the frying channel. The thermal fluid is passed through the flow passages between the sheets by means of a circulation system. Several heating units are arranged in parallel next to one another in a row in the frying channel. Each row of heating units is provided with a distributor and a collector on the ends by means of which the sheets are coupled to the circulation system.

The known heating units of the indirect heating type have some drawbacks.

The available heating power of a deep-frying device is directly linked to the available heating surface of the heating unit. The physical dimensions of the frying oil reservoir limit the available surface for the heating element. If a greater area of heating surface is required, the heating element will have to become larger (higher or wider). By enlarging the heating unit, not only will the frying oil reservoir have to increase in size, but the frying oil volume in the reservoir will have to increase as well. Not only is this not desirable from the point of view of cost, but, in addition, an increased frying oil volume adversely affects the oil degradation process. Another possibility of increasing the heating capacity is to increase the temperature of the thermal fluid. However, increasing the temperature of the thermal fluid will have a direct adverse effect on the oil degradation process.

When processing food products, such as fried chicken, fried fish or meat, fried potato products and the like, food particles, such as bread crumbs, fat residues, pieces of meat and grains come off the food product to be deep-fried and contaminate the frying oil. These frying oil contaminants cause an accelerated degradation of the frying oil. In addition, the particles sink down through the volume of frying oil and end up on the heating unit in the frying oil reservoir as contaminating particles. As a result of the high temperatures of the heating surfaces of these heating units, the loose particles have a tendency to adhere to the heating surfaces of the heating units, resulting in a further acceleration in the degradation of the frying oil.

In heating units of the indirect heating type, it is customary to heat the heating unit using a circulating thermal fluid having an inlet temperature of approximately 260° C. The drop in temperature of the thermal fluid across the heating element is, in the loaded state, usually approximately 20° C. The starting temperature of the thermal fluid is usually approximately 240° C. Thus, the heating surface of the heating unit will usually have a temperature of more than 240° C. Usually, in an industrial-scale frying device, frying or deep-frying oils are used which have a smoke point of approximately 220° C. and a flash point of between 315° C. and 325° C. Due to the fact that the heating surface of the heating elements is at a temperature of more than 240° C., the frying oil will degrade as a result of being in contact with the heating surface. The degradation of the frying oil will occur more quickly at even higher temperatures of the thermal fluid and thus of the heating surface.

Due to the adhesion of particles in the frying oil, the available heat capacity decreases. In practice, the frying-oil temperature control unit further increases the temperature of the thermal fluid by means of which the heating surface is heated in order to compensate for this. This also results in a local increase in the temperature of the heating surface. This temperature increase subsequently increases the adhesion of particles and the effect of the degradation of the frying oil. In the first place, this is disadvantageous because the heat transfer across the heating unit becomes uneven due to the irregular adhesion of loose particles. Furthermore, this process of adhesion may be so intense that the frying process may have to be interrupted in order to clean the heating element. This results in an undesirable standstill of the frying process.

Another drawback thereof is the fact that the circulation system has to meet higher requirements in order to be able to increase the temperature of the thermal fluid. In addition, it is not possible to increase the temperature of the thermal fluid infinitely.

Apart from that, the phenomenon of particles in the frying oil causes problems during cleaning and maintenance of the frying device. Adhered and burnt particles will require a more intense cleaning process. If the frying oil can no longer be used, the volume of frying oil in the frying reservoir has to be discharged and replaced with clean frying oil. This causes a standstill of the frying process, which is obviously undesirable from the point of view of cost.

It is an object of the present invention to at least partially eliminate one of the abovementioned drawbacks and/or to provide a usable alternative. In particular, it is an object of the invention to provide a frying device which (significantly) increases the available heat transfer surface of the heating unit while maintaining the same volume of the unit in the frying oil reservoir. Furthermore, it is a particular object of the invention to improve the heat transfer of the heat transfer surface to the frying oil. Other objects of the invention are to decrease the volume of the frying oil, to lower the temperature of the heat transfer surface, to increase the life of the frying oil and to improve the temperature distribution across the frying oil reservoir. If a thermal heating fluid is used, it is an object of the invention to lower the temperature thereof.

This object is achieved by a frying device according to the invention as defined in claim 1. The invention relates to a frying device for carrying out a frying process for food products. The frying device comprises a frying oil reservoir which can be filled with a volume of frying oil. Furthermore, the frying device has at least one food product carrier which can at least partially be immersed in the frying oil in the frying oil reservoir. The food product carrier is for example a conveyor belt which partially extends in the frying oil reservoir and by means of which the food products can be fried in a continuous process. The food product carrier may, for example, also be a grid by means of which food products can be lowered into the frying oil reservoir in batches. Furthermore, the frying device comprises at least one heating unit having at least one heating element which is positioned at least partially inside the frying oil reservoir. The heating element has a heating surface which is in contact with the frying oil in the frying oil reservoir during the frying process, thus heating the frying oil.

Characteristic of the frying device according to the invention is the fact that the heating unit comprises a frying oil duct with a channel-heating surface. Furthermore, the heating unit comprises a first pump for passing frying oil through the frying oil duct. The channel-heating surface is directly or indirectly in heat-exchanging connection with the heating surface of the heating element. During the frying process, the frying oil duct is in flow communication with the volume of frying oil in the frying oil reservoir, as a result of which frying oil can be passed from the frying oil reservoir through the frying oil duct. The pump for the circulation of the frying oil in the frying oil reservoir can also be used for passing frying oil through the heating element. By means of the channel-heating surface, heat is supplied to the frying oil which is passed through the frying oil duct.

The frying device according to the invention offers various advantages. One important advantage of the invention is the fact that the heat transfer surface of the heating unit can be increased significantly while maintaining the volume which the unit takes up in the frying oil reservoir. Another important advantage is the fact that the heat transfer between the heating unit and the frying oil in the frying oil reservoir according to the invention can be greatly improved. This is primarily a direct result of the forced flow of the frying oil through the frying oil duct. The heat transfer in the frying oil duct is based on forced convection, as a result of which this heat transfer is greater than the heat transfer on the outside of the heating element, which is based more on natural convection.

A further advantage which is achieved by the frying device according to the invention is the fact that the increase in the heat-exchanging surface of the heating element can be used to lower the necessary temperature of the thermal heating fluid. Consequently, the temperature of the heat transfer surface will also be lower. An important advantageous effect which can be achieved with the frying device according to the invention is the fact that the life of the frying oil can be significantly increased. As a result of the frying oil duct, degradation of the frying oil can be prevented. In addition, due to the forced flow of the frying oil along the channel-heating surface, contaminants which float in the frying oil in the form of particles will have a reduced tendency to adhere to the channel-heating surface. As a result thereof, the channel-heating surface remains clean, which is favourable for the heat transfer between the channel-heating surface and the frying oil. The heat capacity of the heating unit remains available, as a result of which the frying process is more efficient. Encrustation of the channel-heating surface by adhering contaminants in the frying oil would require an increase in the capacity of the heating unit, which would result in an increase in the risk of the heating surface locally becoming excessively hot, leading to local burning of the frying oil and thus further degradation of the frying oil. By increasing the life of the frying oil, the volume of frying oil has to be replaced less often, thus requiring a standstill of the frying process less often.

It is furthermore advantageous that, due to the larger available heat-exchanging surface and the more efficient heat transfer, the heating element can be designed to be smaller. This means that, at the same heat requirement, the frying reservoir can be made smaller, for example lower, as a result of which the required volume of frying oil also becomes smaller. A smaller heating element can reduce the flow losses and the required capacity of a heat pump. Thus, smaller dimensions can advantageously result in energy cost savings for heating the frying oil.

Preferably, the channel-heating surface is formed by a part of the heating surface of the heating element.

In one preferred embodiment, the frying oil duct is formed by a tube which absorbs heat from the heating element. Heat is transferred to the tube directly by means of conduction or indirectly by means of an intermediate layer. The tube has a tube wall with an internal surface and an external sleeve surface. The internal surface serves as a channel-heating surface. Via the tube wall, heat is transferred to the frying oil which is passed through the tube.

Preferably, the tube is fixedly connected to the heating element. The fixed connection results in an improved heat transfer between the heating element and the tube. The heat transfer is effected by conduction.

In one preferred embodiment, the heating element comprises a tube-in-tube element having an inner tube which extends inside an outer tube. The tube-in-tube element defines a space having a substantially annular cross section between the inner tube and the outer tube.

Preferably, the tubes have an annular cross section, but any other geometry is also possible, such as cylindrical, square, rectangular, oval, star-shaped and the like.

This space is used as the thermal fluid duct for the passage of a thermal fluid. In addition to the embodiment described below, in which thermal oil is used as the thermal fluid which serves as the heat-exchanging medium, the above-described space can also be used for other heat-exchanging media, such as water, steam or electrically heated elements, and the like.

In one preferred embodiment, the space inside the inner tube is preferably used as frying oil duct, which absorbs heat from the thermal fluid. Heat is transferred directly to the inner tube by means of convection by the thermal fluid. The inner tube has a tube wall with an internal surface and an external sleeve surface. The internal surface serves as channel-heating surface. Via the tube wall, heat is transferred to the frying oil which is passed through the inner tube.

Both the interior surface, the channel-heating surface, in the inner tube and the external heating surface of the outer tube of the tube element contribute to the heat transfer. Frying oil is passed through the inner tube, resulting in heat transfer through forced convection. Around the outer tube, heat transfer occurs mainly as a result of natural convection. To a lesser degree, the circulation of frying oil in the frying oil reservoir also leads to a forced heat transfer on the external heating surface of the outer tube, but this is significantly smaller than the contribution by the natural convection. The inner tube remains substantially clean as a result of the flow velocity of the frying oil. At the flow velocity required to improve the heat transfer on the inside of the inner tube, any particles which are present cannot adhere to the surface. Furthermore, due to the flow, hardly any particles in the frying oil itself adhere to the channel-heating surface. In addition, by first filtering the frying oil before passing it through the frying oil duct, the adhesion tendency can be reduced further.

In one embodiment according to the invention, the inner tube can be positioned with respect to the outer tube by means of defined dents in the outer tube provided for the purpose or by means of spacers. Thus, the shape of the annular cross section between the inner tube and the outer tube remains substantially regular, which keeps the throughflow of thermal fluid at an optimum level.

Preferably, the heating element comprises an arrangement in a row of tube-in-tube elements. The row of tube elements results in a flat embodiment of the heating element, thus advantageously limiting the installation height. In an alternative embodiment, several rows of tube elements one above the other may be provided. However, preferably only one row of tube elements is provided in a substantially horizontal plane in order to reduce the installation height in the frying oil reservoir to a minimum.

As a result of the minimal installation height, the volume of frying oil can be reduced, which is advantageous for uniform and accelerated heating. In addition, changing and maintaining a relatively small volume of frying oil is more advantageous economically.

Preferably, the tube-in-tube elements extend substantially parallel to the direction of transport of the food product in the frying oil reservoir. Thus, the tube-in-tube elements can efficiently compensate for a temperature gradient in the direction of transport of the frying oil reservoir and thus contribute to a uniform temperature distribution. Preferably, the tube elements are evenly distributed across the bottom of the frying oil reservoir in the width direction. This makes it possible to keep the temperature distribution substantially constant along the length and width of the frying oil reservoir.

In one embodiment of the frying device according to the invention, an inlet manifold is provided for a central supply of frying oil to the frying oil ducts in the heating element. The inlet manifold is connected to an inlet of a frying oil duct. Preferably, the frying oil flows freely from the frying oil ducts in the frying oil reservoir.

However, in an alternative embodiment according to the invention, an outlet manifold may be connected to outlets of frying oil ducts so that the heated frying oil can flow out of the frying oil reservoir at a fixed position. If desired, nozzles and extension pieces may be provided in this case.

In one embodiment of the heating element according to the invention, a distributor is connected to an inlet of the thermal fluid duct and a collector is connected to an outlet of the thermal fluid duct. Advantageously, these are used to supply and discharge thermal fluid centrally.

In one preferred embodiment, the discharge for heated frying oil from the frying oil duct of the heating element in the frying oil reservoir is provided on the side of or at the feed position of the food products. In an industrial frying device for a continuous frying process, the food products are supplied continuously by means of a conveyor. It is advantageous to let the frying oil flow out of the frying oil duct at the location of the inlet for food products, since that is where the frying oil cools down most due to the relatively cold supply of food products. By making the frying oil flow out of the heating element in that location, this cooling effect can be compensated for most effectively.

In addition, by discharging frying oil at a position which lies in the direction of transport, for example at the opposite end of the frying oil reservoir, a flow in the volume of frying oil can be caused which flows in the same direction as the direction of transport of the food products. Cocurrent is advantageous, since the frictional forces on the food products are reduced and turbulence is prevented due to the volume of frying oil flowing in the same direction as the direction of transport, which prevents particles from coming off. The frying device in this embodiment according to the invention is thus particularly suitable for frying food products which are provided with a fragile coating layer, such as snack products containing chicken.

In another embodiment, the discharge of heated frying oil from the frying oil duct of the heating element in the frying oil reservoir is provided on the side of the discharge position of the food products. Discharging frying oil at a position on the product inlet side creates a counterflow in the volume of frying oil, counter to the direction of transport of the food products. The supply of frying oil which has been heated by the exterior of the heating element compensates for the significant cooling down of the frying oil by the supply of the relatively cold food products. However, in this embodiment the flow velocity of the frying oil is very limited in order to prevent the food products from being subjected to high frictional forces and thus particles from coming off, which is associated therewith.

In a further preferred embodiment, the frying oil reservoir comprises at least two heating units which are positioned one behind the other in the direction of transport and which define separate heating zones. By providing several heating units in the frying oil reservoir, the overall temperature profile in the frying oil reservoir can be controlled more effectively. In addition, it is possible to create a separate flow in the frying oil reservoir for each heating zone. Thus, it is possible for the frying oil to flow in cocurrent with the direction of transport of food products in one section of the frying oil reservoir, and to flow in a direction counter to the direction of transport in another section. Advantageously, depending on the requirements of the frying process, a cocurrent of the frying oil is generated in the frying oil reservoir in order to reduce the number of particles coming off the food products in order thus to prevent contamination of the frying oil, and a countercurrent of the frying oil is generated in another heating zone of the frying oil reservoir for improving the heat transfer between the frying oil and the food products.

In an advantageous embodiment of the frying device according to the invention, a sediment conveying device is provided in a lower part of the frying oil reservoir for catching and discharging contaminating particles in the frying oil in order to further prevent contamination of the frying oil. Preferably, the sediment conveying device is provided underneath the heating elements.

Furthermore, the invention relates to a method according to claim 16 for frying food products. The method according to the invention comprises the steps of immersing food products in a volume of frying oil in a frying oil reservoir. This may be carried out in batches or in a continuous process by means of a conveyor. With the method, the volume of frying oil is heated by means of a heating unit which is provided with a frying oil duct. Furthermore, the method comprises a step, in which frying oil is passed through the frying oil duct.

In a preferred embodiment according to the invention, the method uses a frying device with a heating unit which is provided with a frying oil duct, in which the frying oil has a flow velocity which is so high that contaminants are prevented from adhering to the heating unit.

In one preferred embodiment of the method according to the invention, a flow is furthermore generated in the frying oil reservoir using the heating unit and a pump. This pump can be the same as the one which is used for the circulation of frying oil in the frying oil reservoir. Further preferred embodiments are defined in the other subclaims.

The invention will be explained in more detail with reference to the attached drawings which show a practical embodiment of the invention, but should not be regarded as being limiting, in which.

Figure 2A:
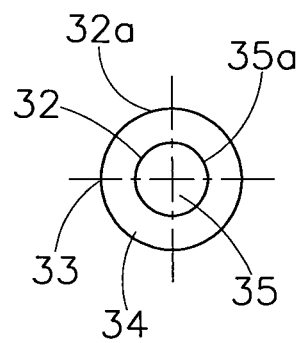
FIG. 2a shows a cross-sectional view of a heating element with a tube-in-tube configuration according to the invention.
Figure 2B:
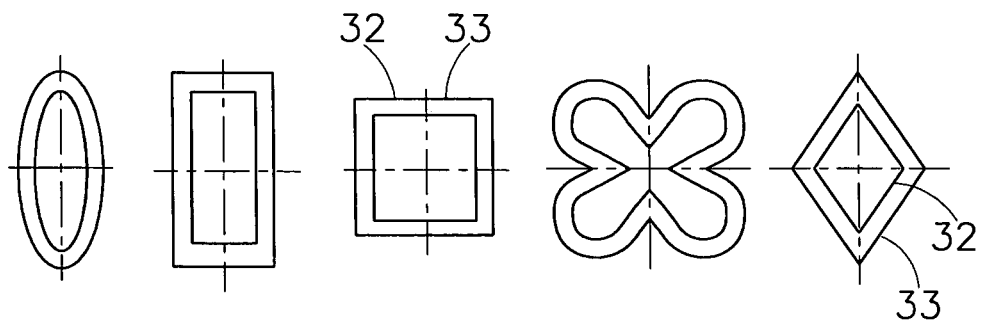
Figure 3A:
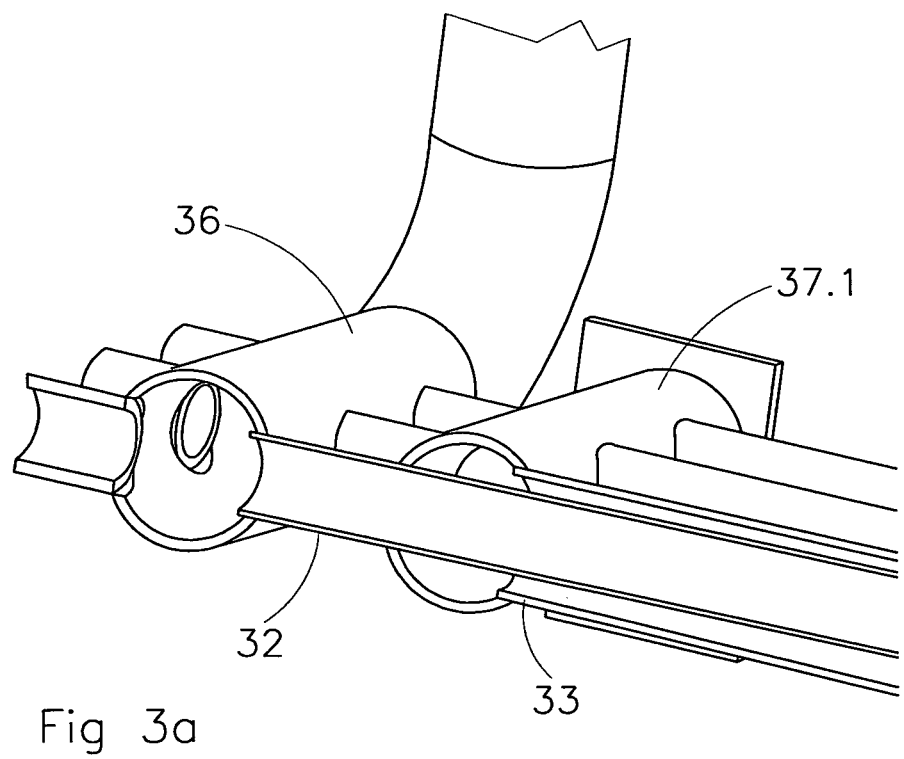
Figure 3B:
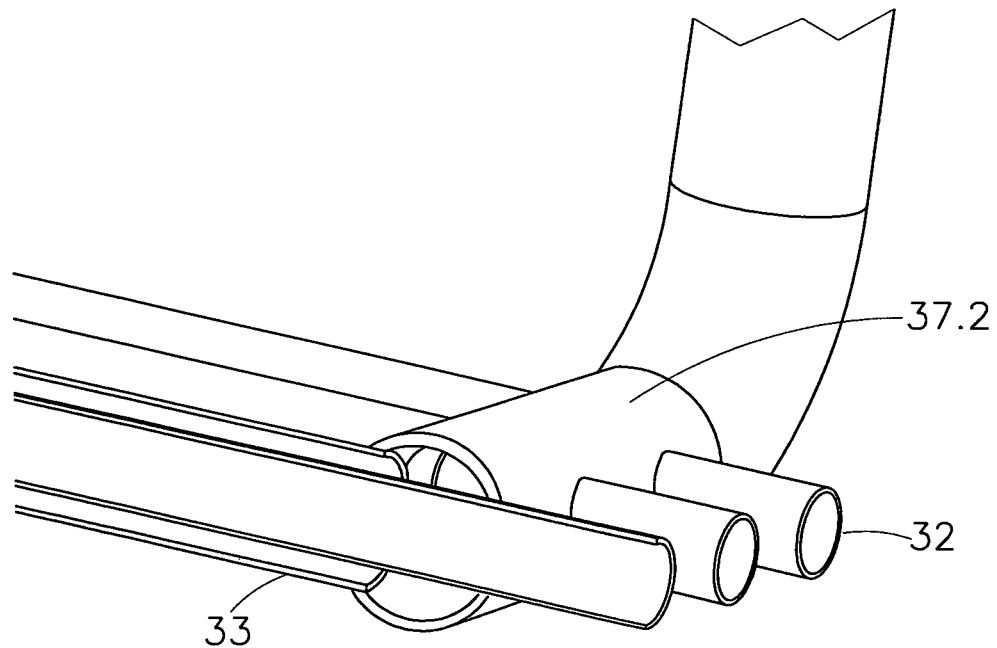
Figure 4B:
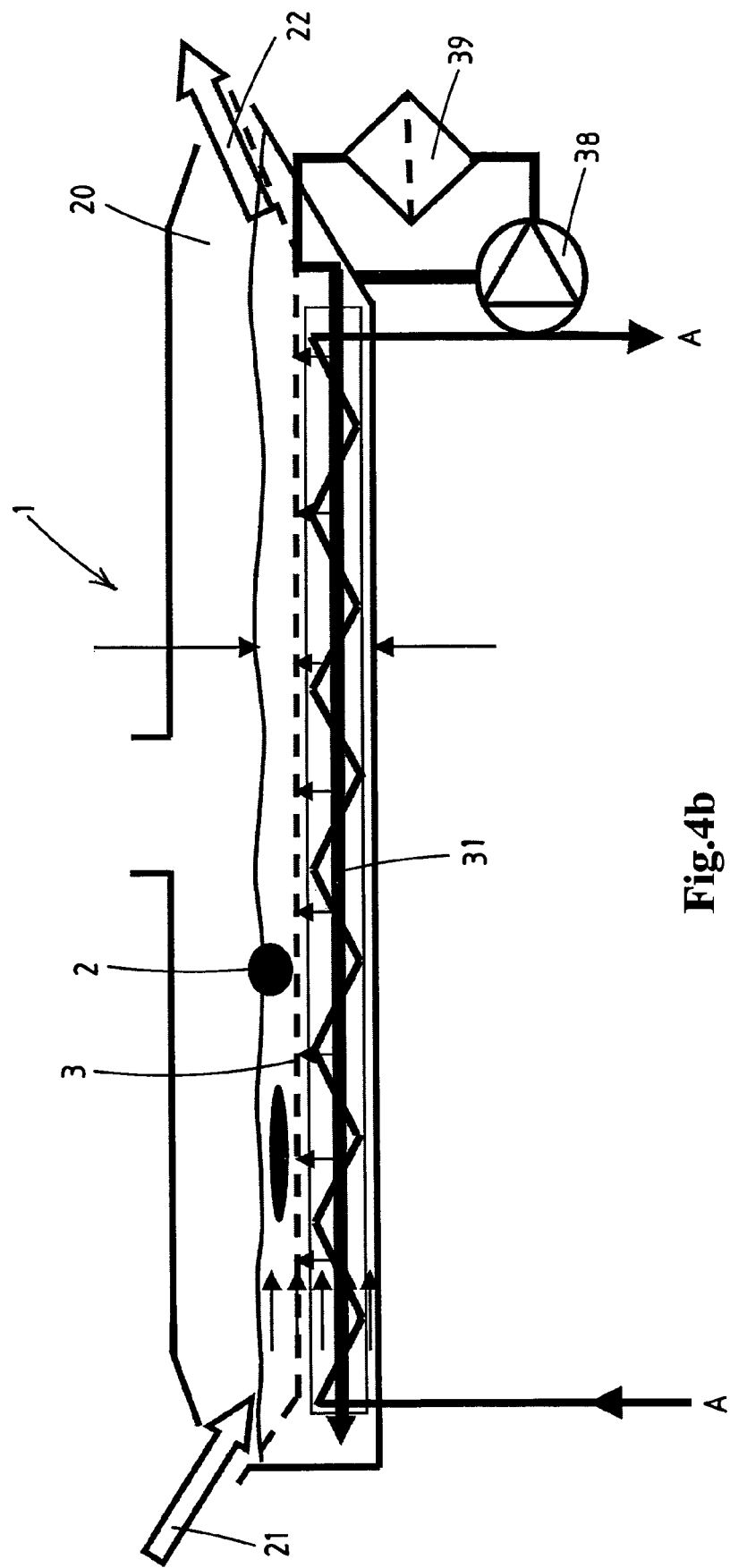

FIG. 2b diagrammatically shows various possible geometries of a heating element according to the invention;

FIG. 3a shows a perspective view of a cross section of a distributor for the supply of thermal fluid and a manifold for the supply of frying oil to the heating element according to the invention;

FIG. 3b shows a perspective view of a cross section of the collector for the discharge of thermal fluid and the discharge of frying oil from the heating element to the frying oil reservoir according to the invention;

FIG. 4a shows a diagrammatic view of a volume of frying oil in the frying oil reservoir flowing counter to the direction of transport;

FIG. 4b shows a diagrammatic view of a volume of frying oil in the frying oil reservoir flowing in the direction of transport; and FIG. 4c shows a diagrammatic view of a frying reservoir, in which, in a section of the frying reservoir, a volume of frying oil flows cocurrently with the direction of transport and, in a subsequent section of the frying reservoir, a volume of frying oil flows counter to the direction of transport.

Figure 1:
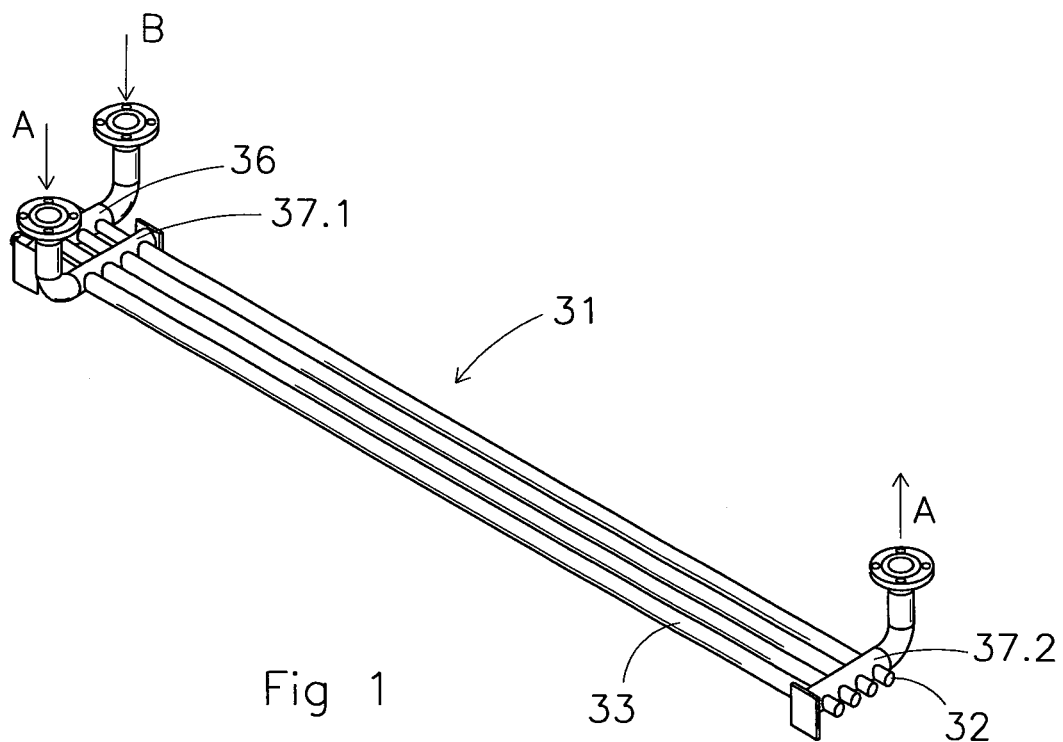
FIG. 1 shows a perspective view of a heating element according to the invention, in which the heating element is designed as a heat exchanger with a tube-in-tube configuration.

FIG. 1 shows a perspective view of a heating element 31 according to the invention. The heating element 31 is designed as a heat exchanger with a tube-in-tube configuration. The tube-in-tube configuration comprises an internal tube, a so-called inner tube 32 which extends inside an external tube, a so-called outer tube 33. Thermal fluid A and frying oil B are supplied to the heating element 31. The frying oil is supplied via an inlet manifold 36 to the inner tubes arranged in a row. Via a distributor 37.1, the thermal fluid A is fed to a thermal fluid duct 34 which is formed by the space between the outer and the inner tube. On the other end of the heating element 31, a collector 37.2 is provided for discharging thermal fluid A. The heated frying oil B in the inner tubes 32 is directly discharged to a frying oil reservoir 20. Depending on the position of the heating element 31 in the frying oil reservoir 20, the frying oil flowing into the frying oil reservoir flows in the direction of transport of the products or in the direction opposite thereto.

FIG. 2a shows a cross-sectional view of a tube-in-tube element which is composed of an inner tube 32 which extends inside an outer tube 33. The inner tube 32 has a smaller diameter than the outer tube 33 and is positioned centrally inside the outer tube 33 by means of spacers. Here, the spacers are designed as plates, but the spacers can also be formed by providing other means of centering, such as dents in the outer tube. Between the inner and the outer tube, there is a space which can be used for passing through thermal fluid. Thus, the space between the inner and the outer tube forms a thermal fluid duct 34. As a result of heat exchange, the inner and the outer tube will heat up. The sleeve surface 32a of the outer tube acts as a heating surface and the frying oil in the frying oil reservoir around the outer tube will heat up mainly as a result of natural convection. The cavity inside the inner tube forms a frying oil duct 35 for passing through frying oil B. The inner surface in the cavity of the inner tube defines the channel-heating surface 35a. Here, heat is exchanged between the inner tube 32 and the frying oil B passed through. In contrast to the heat transfer on the heating surface of the outer tube, which is mainly based on natural convection, heat transfer between the inner tube 32 and the frying oil B passed through takes place by forced convection.

FIG. 2b diagrammatically shows various possible geometries of a heating element according to the invention. The cross sections of the inner and outer tubes may have edges. The cross section of the tubes may be elliptical, right-angled, cloverleaf-shaped etc.

Preferably the heating element for use in a frying device according to the invention comprises several tube-in-tube elements placed in a row next to one another. FIG. 3a shows a perspective view of an embodiment of an inlet manifold for introducing frying oil into the inner tube. The inlet manifold comprises an inlet tube having a round cross section, the inlet tube being arranged perpendicularly and being connected to the inner tubes arranged in a row. The inner tubes protrude through the peripheral wall of the inlet tube.

Furthermore, FIG. 3a shows a distributor 37.1 for the supply of thermal fluid A to the thermal fluid duct 34 of various tube-in-tube elements arranged next to one another in a row. The distributor 37.1 has an inlet tube. The outer tubes 33 of the tube-in-tube elements protrude through the wall of the inlet tube. The end of the outer tube 33 is situated inside the inlet tube of the distributor. The inner tubes of the tube elements extend through the inlet tube up to the distributor arranged next to the inlet manifold for the supply of frying oil B.

FIG. 3b shows a collector 37.2 for the discharge of thermal fluid A from the thermal fluid duct 34 of various tube-in-tube elements arranged next to one another in a row. The collector 37.2 has a discharge tube. The outer tubes 33 of the tube-in-tube elements protrude through the wall of the collector. The end of the outer tube 33 is situated inside the discharge tube of the collector 37.2. The inner tubes 32 of the tube elements extend through the inlet tube of the collector 37.2.

In addition, FIG. 3b shows a perspective view of an embodiment for discharging frying oil from the inner tube to the frying oil reservoir 20. The inner tubes 32 protrude through the peripheral wall of the thermal fluid discharge tube. The frying oil B flows freely from the ends of the inner tubes 32 into the frying oil reservoir 20.

FIG. 4a shows a diagrammatic view of a frying device 1 according to the invention comprising an elongate frying oil reservoir which is filled with frying oil. The frying oil B flows counter to the direction of transport of food products 2 on a food product carrier 3 in the frying oil reservoir 20. At one end, the frying oil reservoir has a feed position 21 for food products 2 and a discharge position 22 at the opposite end. The frying oil reservoir 20 is filled with a volume of frying oil. Furthermore, the frying device 1 is provided with a heating unit 30 with a heating element 31, such as is illustrated in FIG. 1. The inlet side for thermal fluid A and frying oil B in the heating unit 30 is in this case situated near the feed position 21 for the food products 2. By introducing relatively cold food products 2, more heating capacity will be required at the feed position 21 of the frying oil reservoir 20. Therefore, it is advantageous to arrange the inlet for thermal fluid A at a high inlet temperature near the feed position 21 for food products. The supply of frying oil B to the inner tube 32 of the frying oil duct 35 of the heating element 31 is also provided on this side of the frying oil reservoir 20. At the feed position 21 for food products 2, frying oil B is discharged from the frying oil reservoir 20 and is returned to the frying oil duct 35 in the heating element 31 by means of a circulation pump 38, if desired through a filter 39.

In FIG. 4a, the frying oil duct of the heating element ends at the discharge position for food products at the opposite end of the frying oil reservoir, the product discharge side. There, the heated frying oil B flows out of the frying oil reservoir 20. By discharging frying oil B on one side of the frying oil reservoir 20 and supplying frying oil B on the other side of the frying oil reservoir 20, a flow of frying oil B counter to the direction of transport of the food products 2 is created within the volume of frying oil inside the frying oil reservoir 20. As a result of the counterflow of frying oil, an effective exchange of heat with the food products 2 is created which is relatively high compared to a frying oil reservoir 20 with a substantially stationary volume of frying oil.

FIG. 4b shows a diagrammatic view of a frying device 1 which is similar to that of FIG. 4a. However, in FIG. 4b the supply of frying oil to the frying oil duct 35 in the heating element 31 is provided near the discharge position 22 of the food products 2. The frying oil B in the frying oil reservoir 20 is therefore also discharged at this end and is fed, via the circulation pump 38, to the frying oil duct 35, which ends into the frying oil reservoir 20 near the feed position 21 for food products 2. As a result thereof, a flow is created within the volume of frying oil B in the frying oil reservoir 20, the direction of which is substantially equal to the direction of transport of food products 2. The advantage of frying oil B flowing in cocurrent is that fewer contaminating particles will come off the food product 2.

FIG. 4c shows an embodiment of the frying device 1 according to the invention which has been optimized further. Analogously to the illustrations from FIG. 4a and FIG. 4b, heating elements 31 are arranged inside a frying oil reservoir 20. Moving several heating elements 31 within the frying oil reservoir 20 has resulted in separate temperature zones. By placing at least two heating units 30 one behind the other, the frying oil reservoir 20 is divided into separate temperature zones. In a first section, starting at the feed position 21 for food products 2, a temperature zone is created in which, analogously to the situation in FIG. 4b, the volume of frying oil B flows in cocurrent in the frying oil reservoir 20. The fact that the frying oil flows in cocurrent contributes to a reduced contamination by particles coming off food products 2. Once the food product has been in the frying oil for some time, fewer particles will come off. In a subsequent section of the frying oil reservoir 20, it is therefore advantageous to position a heating unit 30 in such a manner that a counterflow of the volume of frying oil B is generated in that section of the frying oil reservoir 20. Thus, the heat exchange between the frying oil B and the food product 2 is improved without this causing an increase in the number of particles coming off.

The embodiments illustrated in FIG. 4 are three possible embodiments of the invention. Many variants are possible in addition to the embodiments shown in the figures without departing from the scope of protection as defined in the attached claims.

Thus, according to the invention, a frying device for frying food products is provided, with which significant savings can be achieved in use. In particular, it provides increased heating capacity due to the enlarged heating surface of the heating unit. Apart from the increased heating capacity, the frying oil duct makes efficient heat transfer, a smaller frying oil volume, a lower temperature of the thermal fluid (if present), a longer life of the frying oil and an improved temperature distribution across the frying oil reservoir possible.

The invention claimed is:

1. A frying device for carrying out a frying process for food products comprising:
a frying oil reservoir to be filled with a volume of frying oil;
a food product carrier which is at least partially immersable in the frying oil in the frying oil reservoir;
at least one heating unit having at least one heating element which is positioned at least partially inside the frying oil reservoir and which has a heating surface which is in contact with the frying oil in the frying oil reservoir during the frying process, wherein the at least one heating unit is heated by a thermal heating fluid during the frying process,
wherein the at least one heating unit comprises a frying oil duct with a channel-heating surface, in which the frying oil duct is formed by a tube and extends substantially within the frying oil reservoir, in which the channel-heating surface is in heat-exchanging connection with the heating surface of the at least one heating element, in which, during the frying process, the frying oil duct is in flow communication with the volume of frying oil in the frying oil reservoir and in which the at least one heating unit furthermore comprises a pump for passing frying oil through the frying oil duct, so that by means of the channel-heating surface heat is supplied to the frying oil which is passed through the frying oil duct, and
wherein the at least one heating element comprises a tube-in-tube element having an inner tube which extends inside an outer tube, which tube-in-tube element defines a space between the inner tube and the outer tube which forms a channel for the passage of a heat-carrying medium.

2. The frying device according to claim 1, in which the frying oil duct is at least partially delimited by at least part of the heating surface of the at least one heating element.

3. The frying device according to claim 1, in which the tube is fixedly connected to the at least one heating element.

4. The frying device according to claim 1, in which the space is a substantially annular cross section.

5. The frying device according to claim 1, wherein an inlet manifold for introducing frying oil is connected to an inlet of the frying oil duct.

6. The frying device according to claim 1, wherein an inlet distributor is connected to an inlet of a thermal fluid duct and an outlet collector is connected to an outlet of the thermal fluid duct.

7. The frying device according to claim 1, wherein the food product carrier is a conveyor belt, wherein the outlet of the frying oil duct is situated substantially on the side of or at a feed position for the food products, in such a manner that a flow of frying oil is created in the frying oil reservoir in a direction of transport of the food products.

8. The frying device according to claim 7, in which the distributor is situated at a discharge position of the food products.

9. The frying device according to claim 1, in which only one row of heating elements is provided in a horizontal plane inside the frying oil reservoir.

10. The frying device according to claim 7, in which at least two heating elements which are positioned one behind the other in the direction of transport in the frying oil reservoir and have an inlet and an outlet for frying oil which define separate heating zones.

11. The frying device according to claim 10, in which the outlet of the frying oil duct for the discharge of frying oil from a first heating element is positioned at the feed position for food products and in which the outlet of a frying oil duct for the discharge of frying oil from a second heating element is positioned at the discharge position for food products.

12. The frying device according to claim 1, in which a sediment conveying device is provided in a lower part of the frying oil reservoir for catching and discharging contaminating particles in the frying oil.

13. A heating unit for a frying device for carrying out a frying process for food products, wherein the frying device comprises a frying oil reservoir to be filled with a volume of frying oil; and a food product carrier which is at least partially immersable in the frying oil in the frying oil reservoir,
   wherein the heating unit has at least one heating element which is positioned at least partially inside the frying oil reservoir and which has a heating surface which is in contact with the frying oil in the frying oil reservoir during the frying process, wherein the heating unit is heated by a thermal heating fluid during the frying process,
   wherein the heating unit comprises a frying oil duct with a channel-heating surface, in which the frying oil duct is formed by a tube and extends substantially within the frying oil reservoir, in which the channel-heating surface is in heat-exchanging connection with the heating surface of the at least one heating element, in which, during the frying process, the frying oil duct is in flow communication with the volume of frying oil in the frying oil reservoir and in which the heating unit furthermore comprises a pump for passing frying oil through the frying oil duct, so that by means of the channel-heating surface heat is supplied to the frying oil which is passed through the frying oil duct, and
   wherein the at least one heating element comprises a tube-in-tube element having an inner tube which extends inside an outer tube, which tube-in-tube element defines a space between the inner tube and the outer tube which forms a channel for the passage of a heat-carrying medium.

14. A method for frying food products comprising the following steps:
   completely or partially immersing food products in a volume of frying oil in a frying oil reservoir;
   heating the volume of frying oil with a heating unit according to claim 13 which is provided with a frying oil duct; and
   passing frying oil through the frying oil duct.

15. The frying device according to claim 2, in which the tube is fixedly connected to the at least one heating element.

16. The frying device according to claim 2, in which an inlet manifold for introducing frying oil is connected to an inlet of the frying oil duct.

17. The frying device according to claim 3, in which an inlet manifold for introducing frying oil is connected to an inlet of the frying oil duct.

* * * * *